United States Patent [19]

Noack et al.

[11] 3,951,237
[45] Apr. 20, 1976

[54] SHOCK ABSORBER

[75] Inventors: Dieter Noack; Joachim Diekmann; Horst Eggert; Robert Kugler, all of Berlin, Germany

[73] Assignee: Siemens Aktiengesellschaft, Munich, Germany

[22] Filed: Sept. 19, 1974

[21] Appl. No.: 507,561

[30] Foreign Application Priority Data

Sept. 21, 1973 Germany............................ 2348135
Apr. 2, 1974 Germany............................ 2416319

[52] U.S. Cl. .................................. 188/1 B; 248/20
[51] Int. Cl.[2]........................................... F16F 7/08
[58] Field of Search................. 188/1 B; 248/19, 20, 248/358 R

[56] References Cited
UNITED STATES PATENTS

| | | | |
|---|---|---|---|
| 3,045,340 | 7/1962 | Iao................................ | 188/1 B UX |
| 3,259,212 | 7/1966 | Nishioka et al. .................... | 188/1 B |
| 3,567,841 | 3/1971 | Kobayashi....................... | 188/1 B X |

FOREIGN PATENTS OR APPLICATIONS 1,302,598  7/1962  France ............................... 188/1 B

*Primary Examiner*—Duane A. Reger
*Attorney, Agent, or Firm*—Kenyon & Kenyon Reilly Carr & Chapin

[57] ABSTRACT

A shock absorber for the absorption of vibrations acting horizontally between foundation and base of an apparatus includes two shock absorbing components which are connected to each other through a pendulum. The free ends of the pendulum are linked in wobble-like fashion to respective ones of the shock absorbing components and at least one friction surface is disposed between the shock absorbing components for absorbing the vibrations and translating the same into heat.

7 Claims, 7 Drawing Figures

SHOCK ABSORBER

BACKGROUND OF THE INVENTION

The invention relates to a shock absorber for the absorption of vibrations acting horizontally between the foundation and the base of an apparatus such as high-voltage switch-gear to be installed in earthquake-prone areas. The shock absorber includes a first component which can be firmly anchored in a foundation and a second component which is movable horizontally relative to the first component and can be firmly coupled to the base. Also provided is means for attenuating the vibrations between both shock absorber components.

When installing high-voltage switch-gear such as outdoor power circuit breakers in earthquake-prone areas, the problem often arises to keep horizontally acting vibrations occurring during earthquake shocks away from the base of the apparatus in order to avoid damage to the switch-gear.

Commercially available rubber spring elements, so-called anti-vibration mounts, suitable as supports for smaller machines, are not suited as shock absorbers for high-voltage switch-gear, which may weigh several thousand kilograms, because their ability to function is largely lost by the supported weight; that is, the damping components of the anti-vibration mounts are already deformed by the load of the switch-gear to the point where they behave like stiff, rigid parts.

German Pat. No. 335,259 discloses a foundation for large prime movers with reciprocating or rotating machine masses. The foundation is so constructed that vibrations emanating from the machine masses are not transferred to the foundation. To accomplish this, the known foundation is provided with a foundation block resting on roller bearings and supported on piers via additional buffers, such as hydraulic buffers with air cushions. This results in a damping device with a first, upper component which can be connected to the apparatus and a second, lower component which can be anchored to the foundation, both components of the damping device being supported by roller bearings for the achievement of any mutual horizontal motion. Centering damper elements are disposed between the upper and lower component.

Deutsche Auslegeschrift No. 1,182,604 discloses an arrangement for attenuating vibrations in drum type washing machines with a spin cycle in which are provided, both at the base plate and at the upper part of the machine, rollers enabling the machine to have horizontal mobility. In addition, brake linings are provided between the base plate and the upper part of the machine causing a reduction of the horizontal motion energy.

Finally, it is known from U.S. Pat. No. 3,730,463 to equip a shock absorber for switch-gear to be installed in earthquake-prone areas with balls for a horizontal motion and with an annular rubber part as a damping element which centers the two components of the shock absorber.

SUMMARY OF THE INVENTION

It is an object of the invention to provide a different solution to the problem of making ineffective vibration amplitudes which act horizontally between the foundation and the base of an apparatus. It is another object of the invention to provide a shock absorber to absorb such vibrations. It is still another object of the invention to provide a shock absorber which will keep earthquake shocks away from apparatus such as high-voltage switch-gear to be installed in earthquake-prone areas.

The shock absorber according to the invention absorbs vibrations acting horizontally between the mounting foundation and the base of an apparatus such as a high-voltage circuit breaker or the like which is intended to operate at a location where the foundation can be subjected to vibrations caused by an earthquake or some other source. The shock absorber according to the invention includes as a feature two shock absorber components connected to each other by means of a pendulum, the free ends of which are linked in wobble-like fashion to the shock absorber components, respectively. At least one friction surface is disposed between the shock absorber components. The shock absorber according to the invention enables the apparatus to be freely movable horizontally within wide limits relative to the earthquake vibrations, that is, the apparatus is floatatively mounted with the horizontal motion energy being idssipated by friction which is preferably effective constantly.

According to a preferred embodiment of the shock absorber according to the invention, the shock absorber component coupled to the apparatus base is suspended relative to the other shock absorber component. For this purpose, the free ends of the pendulum may be provided with universal joints, respectively.

One particularly advantageous embodiment of the shock absorber according to the invention is that the shock absorber component, that can be anchored in the foundation, is configured in the form of an essentially U-shaped support between whose legs the shock absorber component connected to the apparatus base freely moves in wobble-like fashion. Here, the upper joint of the pendulum may be mounted to the base of the U-shaped support. According to another feature of the shock absorber according to the invention, a friction surface is arranged between the free ends of the U-shaped support whereon a brake body connected to the apparatus base is provided so as to support itself resiliently against this friction surface. In this manner, if vibrations occur, the motion energy can be converted into friction heat.

According to an alternate embodiment, the friction surface can be arranged between the universal joint components and also be spring loaded. The vibration damping is then accomplished in a particularly advantageous manner by a friction surface which is located in an already existing structural part of the shock absorber whereby the vibration attenuation is independent of the position in the assembly and thus uniformly effective.

In this alternate embodiment, a particularly favorable configuration results from making the springs cup-type springs which are capable of acting upon the friction surface and are mounted on the universal joint pins. It may be advantageous for uniform friction damping over long periods of time to dispose the friction surface hidden inside the universal joint. Contamination and corrosive influences can thus be kept away from the friction surfaces. Such an embodiment is particularly well suited for open-air installations.

Although the invention is illustrated and described herein as a shock absorber, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
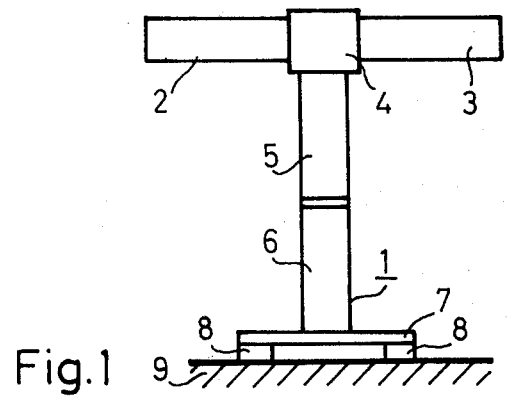
FIG. 1 is a schematic diagram showing an elevation view of a high-voltage power circuit breaker constructed as an open air switch and is exemplary of the equipment supportable by the shock absorbing apparatus according to the invention.

The power circuit breaker 1 shown in FIG. 1 has two switching chambers 2, 3 which are connected in series electrically and are joined to each other through a gear head 4 and are mounted by means of support insulators 5, 6 on an apparatus base 7 which is connected to the foundation 9 through shock absorbers 8. The apparatus base 7 may be connected to the foundation 9 through three or more shock absorbers 8. The high-voltage power circuit breaker can be constructed for a voltage such as 220 kV and may weigh approximately 6000 kg.

The shock absorbers 8 are provided in order to keep vibration amplitudes, transmitted to the foundation 9 during an earthquake, away from the power circuit breaker 1. Accordingly, the purpose of these shock absorbers is primarily to keep away from the apparatus base the horizontally acting vibrations harmful to the power circuit breaker thereby eliminating the danger of damage thereto.

Figure 3:
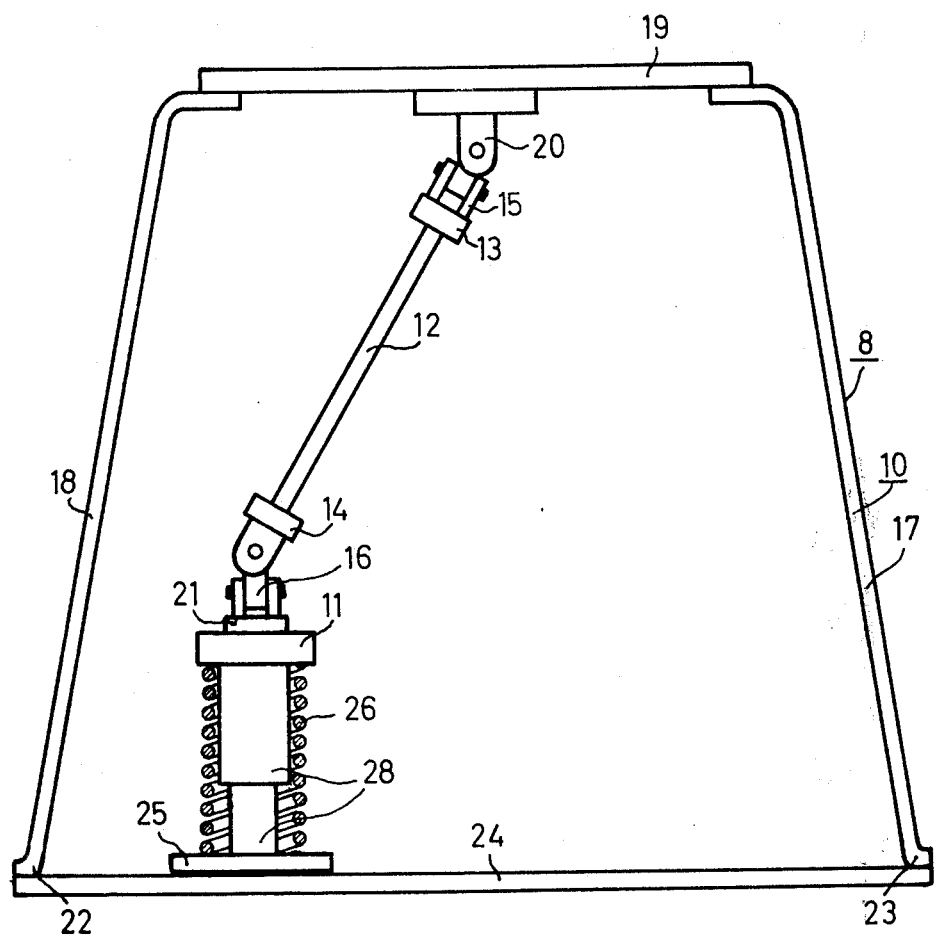
FIG. 3 is an end view of the shock absorbing apparatus of FIG. 2.
Figure 2:
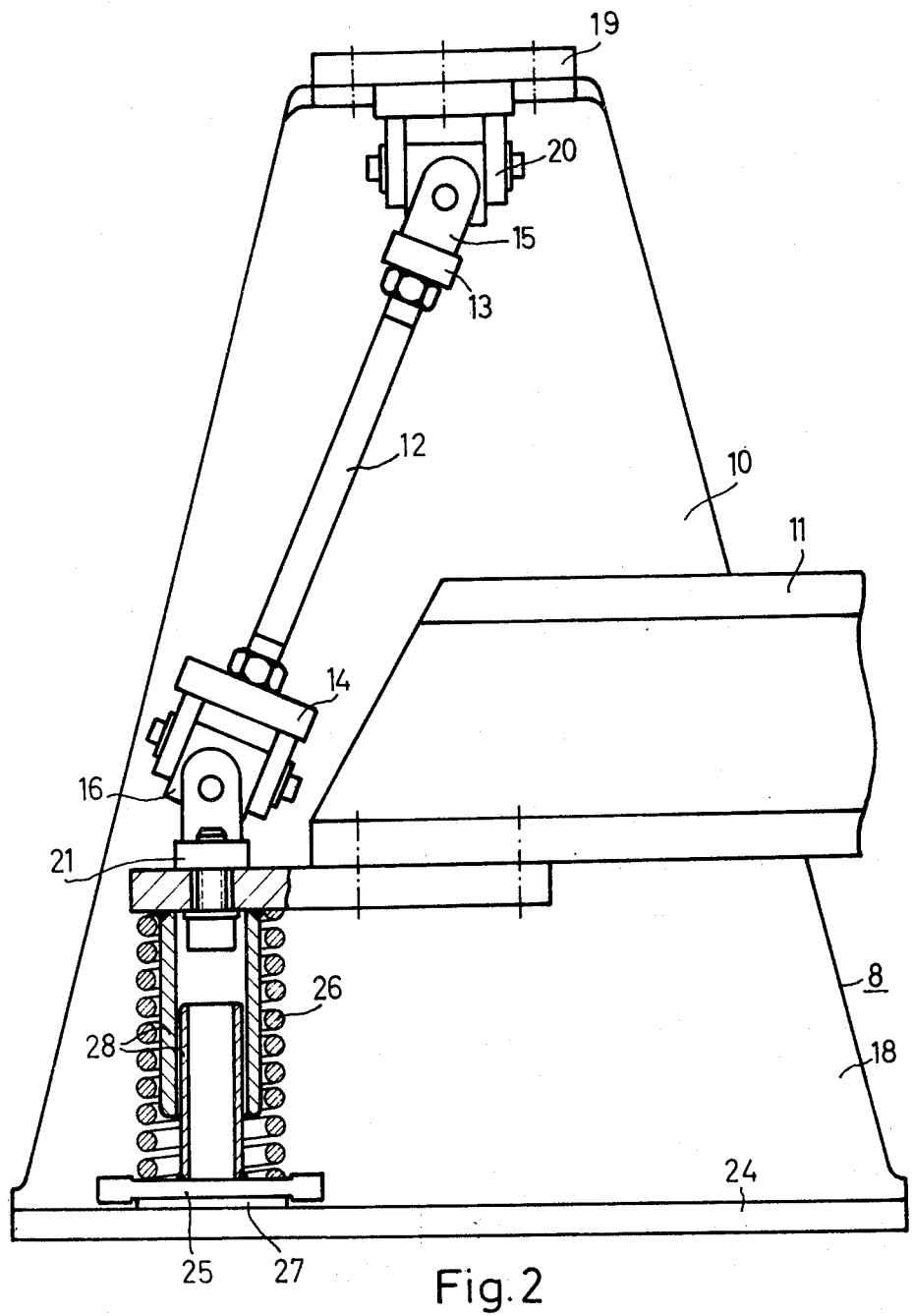
FIG. 2 is a schematic diagram, partially in section, illustrating an elevation view of the shock absorber according to the invention.

As may be seen from FIGS. 2 and 3, the shock absorber consists essentially of two shock absorber components 10 and 11 movable relative to each other. The first one of the shock absorber components 10 can be firmly anchored in the foundation 9; whereas, the second component 11 can be firmly coupled to the base 7 of the apparatus. The two shock absorber components 10 and 11 are connected to each other by a pendulum 12, the free ends of which 13, 14 are linked in wobble fashion to shock absorber components 10 and 11, respectively. For this purpose, the free ends 13, 14 of the pendulum 12 are equipped with universal joints 15, 16. The arrangement of the shock absorber components 10, 11 is such that the shock absorber component 11, coupled to the apparatus base 7, is mounted so as to be suspended relative to the other shock absorber component.

As shown in FIG. 3, the shock absorber component 10 consists of an essentially U-shaped support between whose legs 17, 18 the shock absorber component 11, connected to the apparatus base 7, moves freely in wobble-like fashion. The upper joint 20 of the pendulum 12 is mounted to the base 19 of the U-shaped support. The lower joint 21 of the pendulum is rigidly joined to the shock absorber component 11. A friction surface means can be disposed between the first component 10 and the second component 11. The friction surface means can be configured by disposing a friction surface 24 between the free ends 22, 23 of the U-shaped beam and on this surface 24 is supported a brake body 25 loaded by a spring 26. The brake body 25 is carried by a telescoping guide 28 and follows the horizontal motions of the shock absorber component 11. The bottom of the brake body 25 is lined with a friction lining 27. This makes it possible to convert the horizontal motion energy into friction heat.

Figure 4:
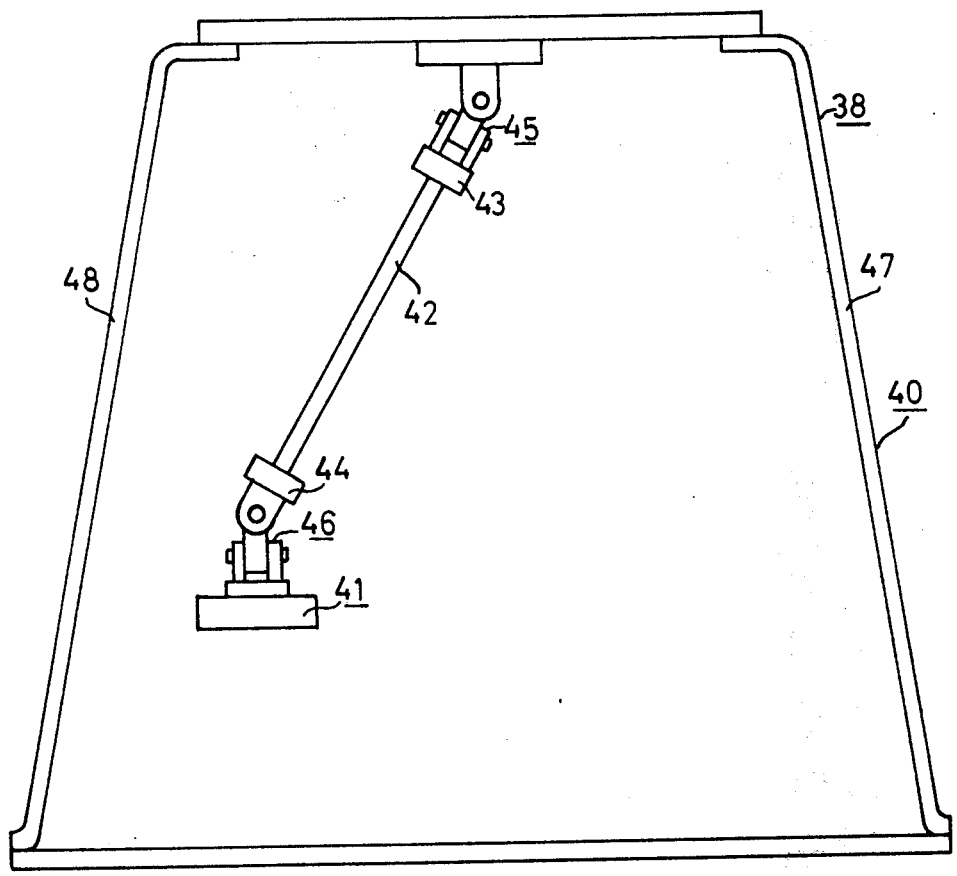
FIG. 4 is an elevation view of an alternate embodiment of the shock absorber according to the invention. This shock absorber is also suitable for supporting an apparatus such as that shown in FIG. 1.

Referring now to FIG. 4, the shock absorber 38 includes essentially two shock absorber components 40 and 41 movable relative to each other. The first shock absorber component 40 can be firmly anchored in the foundation 9 (FIG. 1); whereas, the second component 41 can be firmly coupled to the base 7 of the apparatus 1 (FIG. 1). The shock absorber components 40, 41 are connected to each other by the pendulum 42, the free ends of which 43 and 44 are linked in wobble-like fashion to shock absorber components 40 and 41, respectively. For this purpose, the free ends 43 and 44 of the pendulum 42 are equipped with universal joints 45 and 46, respectively. This results in the suspended arrangement of the one shock absorber component 41 relative to the other fixed shock absorber component 40 whereby the shock absorber components are assured free horizontal mobility relative to each other within wide limits.

In FIG. 4, the shock absorber component 41 is shown in a deflected, rather than a quiescent, position relative to the shock absorber component 40.

The shock absorber component 40 includes an essentially U-shaped support between whose legs 47 and 48 the shock absorber component 41 connected to the apparatus base 7 moves freely in wobble-like fashion. In order to convert the horizontal motion energy generated in the event of vibrational amplitudes into frictional heat, at least one friction surface is provided between the shock absorber components 40 and 41. According to this embodiment of the invention, this friction surface is disposed between the parts of the universal joint component and is loaded by compression springs.

Figure 5:
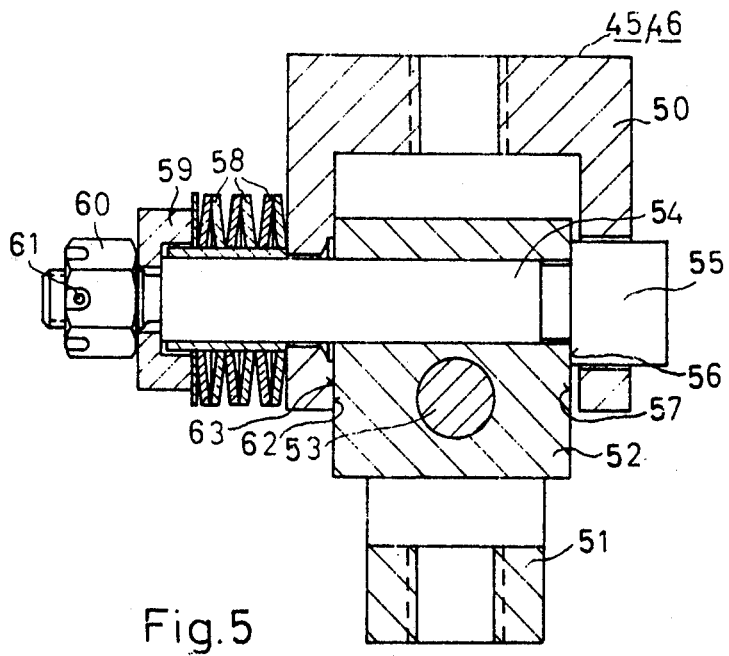
FIG. 5 is an elevation view, partially in section, of a universal joint which constitutes part of the shock absorbing apparatus shown in FIG. 4.
Figure 6:
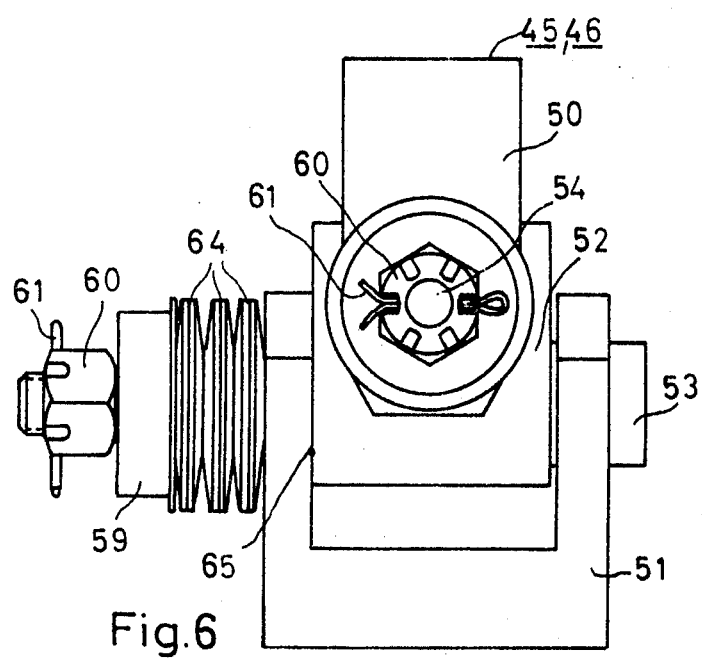
FIG. 6 is a side view of the universal joint shown in FIG. 5.

Referring now to FIGS. 5 and 6, the universal joint 45, 46 includes a fork 50 and a fork 51 linked to each other by a linkage head 52. The joints are formed by pins 53, 54 which penetrate the linkage head 52 and the ends of the forks 51 and 50, respectively, in different planes offset by 90° relative to each other.

As FIG. 5 shows, the linkage head 52 is penetrated by a pin 54 supporting at its one end a head 55. The head 55 has a shoulder 56 resting against the surface 57 of the linkage head 52. The other end of pin 54 is provided with an adjusting nut 60, with a stack of springs consisting of several cup-type springs 58 and a pressure plate 59 interposed, by which nut the spring force of the stack of springs loading the pin 54 is adjustable. A cotter pin 61, penetrating the pin 54, fixes the set rotary position of the nut 60 relative to the pin.

Through the force of the cup-type springs 58, the shoulder 56 pushes the surface 62 of the linkage head 52 against the surface 63 of the fork 50. Both surfaces 62, 63 may be provided with a friction lining and conjointly form the friction surface for reducing the motion energy.

Another view of the universal joint 45, 46 is shown in FIG. 6 in which identical parts have the same reference symbols. As may be seen from FIG. 6, the pin 53 which is of the same configuration as pin 54, is loaded by a spring stack consisting of several cup-type springs 64. Also, the structural configuration and the action of the joint formed by the pin 53 are the same as those described in connection with pin 54. At reference numeral 65, this results in friction surfaces on the fork 51 and on the head 52 of the universal joint 45, 46, both of which may also be provided with a friction lining.

Figure 7:
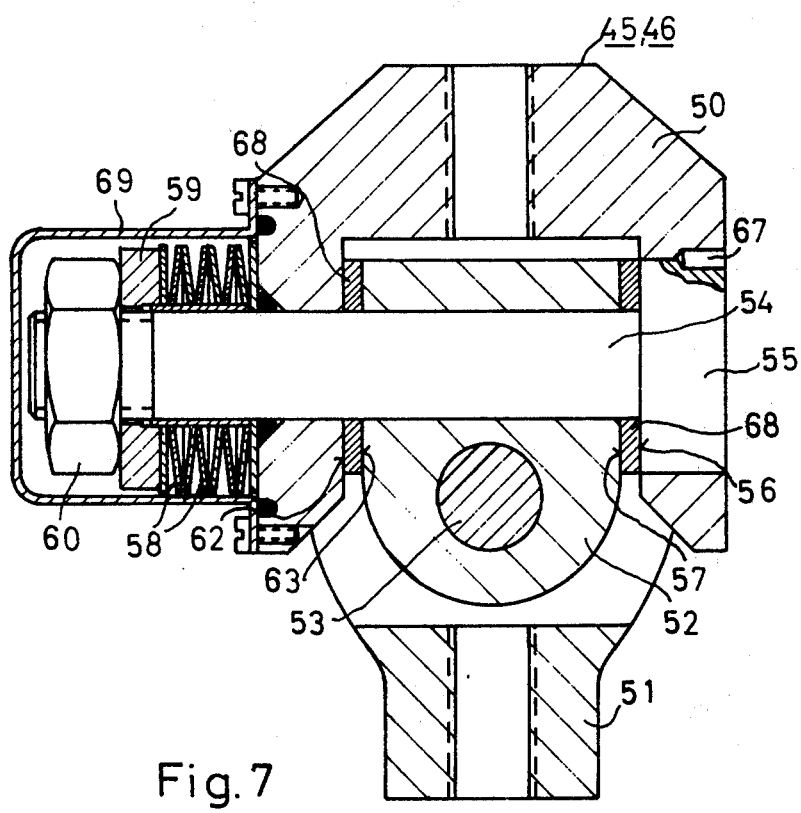
FIG. 7 is a schematic diagram, partially in section, illustrating an elevation view of an alternate embodiment of the universal joint for the shock absorber of FIG. 4.

A somewhat different embodiment of the universal joint 45, 46 is shown in FIG. 7 in which identical parts have the same reference symbols. Essentially, this embodiment differs from that shown in FIGS. 5 and 6 in that the pins 54 and 53 of the joint have an enlarged head 55 which, by means of a pin 67, secures the pins 54, 53 against rotation, but allows them to move axially relative to the forks 50, 51. The anti-rotation arrangement of the bolts 54 and 53 obtained in this manner makes it possible to provide two shock absorption devices for each bolt 53 and 54. The first absorption device is located between the shoulder 56 and the friction surface 57. It is formed by a disc 68 of friction material. The second absorption device is located between the surfaces 62 and 63, similar to the embodiment according to FIGS. 5 and 6, the second absorption device containing a similar disc 68 as the friction material. The joint arrangement for bolt 53 is the same as for bolt 54.

The spring stacks 58 disposed outside of the forks 50 and 51, including the adjustment devices 59, 60, 61, may be covered by a dust protective cap 69 attached to the forks 50, 51.

In the two embodiment examples described last, the friction surfaces 62, 63 are disposed hidden inside the universal joint so that the damping effect of the shock absorber according to the invention is not impaired or altered by contamination and corrosive influences even after a long period of operation in the open air. Thus, the properties of the shock absorber according to the invention remain intact over a long period of time without special maintenance.

What is claimed is:

1. A shock absorber for absorbing vibrations acting between a first part and a second part of an apparatus such as a high-voltage circuit breaker which is intended to operate at a location where the apparatus can be subjected to vibrations caused by an earthquake or some other source comprising: a first component tightly attachable to the first part; a second component movable with respect to said first component and tightly connectable to the second part of the apparatus; and, a pendulum assembly for connecting said components together, said pendulum assembly including a pendulum member having longitudinal end portions at respective ends thereof; first coupling means for connecting one of said end portions of said pendulum member to said first component so as to enable said pendulum member to move in a wobble-like fashion with respect to said first component; second coupling means for connecting the other end portion of said pendulum member to said second component so as to enable said pendulum member to move in a wobble-like fashion with respect to said second component; and, friction means disposed between said first component and said second component for absorbing the vibrational movements; each of said coupling means being a universal joint attached to a corresponding one of said end portions of said pendulum member, each of said universal joints including at least two fork members, a linkage head, and pins for pivotally connecting corresponding ones of said fork members to said linkage head, said friction means comprising: friction surface means at the interface of the linkage head and at least one of the fork members in at least one of said universal joints, and spring means for applying pressure at said interface.

2. The shock absorber of claim 1, said first component being configured so as to enable said pendulum assembly to suspend said second component from said first component.

3. The shock absorber of claim 2, said first component being a U-shaped support member tightly attachable to the first part of the apparatus, said U-shaped member having leg portions joined by a common base portion, said pendulum assembly being attached to said U-shaped member so as to cause said second component to be supported between said leg portions so as to move freely therebetween in a wobble-like fashion.

4. The shock absorber of claim 1, said spring means being cup-type springs arranged on the corresponding pin of said one of said universal joints for applying pressure at said interface.

5. The shock absorber of claim 1, said interface being disposed away from the outside of said universal joint whereby said interface is protected from contamination and corrosive influences present in the open air.

6. A shock absorber for absorbing vibrations acting between a first part and a second part of an apparatus such as a high-voltage circuit breaker which is intended to operate at a location where the apparatus can be subjected to vibrations caused by an earthquake or some other source comprising: a first component tightly attachable to the first part; a second component movable with respect to said first component and tightly connectable to the second part of the apparatus; and, a pendulum assembly for connecting said components together, said pendulum assembly including a pendulum member having longitudinal end portions at respective ends thereof; first coupling means for connecting one of said end portions of said pendulum member to said first component so as to enable said pendulum member to move in a wobble-like fashion with respect to said first component; second coupling means for connecting the other end portion of said pendulum member to said second component so as to enable said pendulum member to move in a wobble-like fashion with respect to said second component; and, friction means disposed between said first component and said second component for absorbing the vibrational movements; said first component being a U-shaped support member having leg portions joined by a common base portion, the free ends of said respective leg portions of said U-shaped support member being tightly attachable to the first part of the apparatus, said pendulum assembly being attached to said U-shaped member so as to cause said second component to be supported between said leg portions so as to move freely therebetween in a wobble-like fashion; said friction means comprising: friction surface means formed in the surface of the first part between said free ends of said U-shaped support member; a brake body connected to the second part of the apparatus; and, spring means for resiliently bracing said brake body on said friction surface means with respect to said second component.

7. The shock absorber of claim 6, each of said coupling means being a universal joint attached to a corresponding one of said end portions of said pendulum member.

* * * * *